US012674497B2

(12) United States Patent
Thompson et al.

(10) Patent No.: US 12,674,497 B2
(45) Date of Patent: Jul. 7, 2026

(54) CONSTANT PRESSURE GENERATING SYSTEM

(71) Applicant: White's Welding, LLC, Woodward, OK (US)

(72) Inventors: Russell Thompson, Woodward, OK (US); Alexander L. Marks, Edmond, OK (US)

(73) Assignee: White's Welding, LLC, Woodward, OK (US)

( * ) Notice: Subject to any disclaimer, the term of this patent is extended or adjusted under 35 U.S.C. 154(b) by 471 days.

(21) Appl. No.: 18/144,032

(22) Filed: May 5, 2023

(65) Prior Publication Data

US 2024/0369118 A1     Nov. 7, 2024

(51) Int. Cl.
| | |
|---|---|
| *F16D 65/28* | (2006.01) |
| *F15B 15/14* | (2006.01) |
| *F15B 15/28* | (2006.01) |
| *F16D 55/02* | (2006.01) |
| *F16D 66/00* | (2006.01) |

(52) U.S. Cl.
CPC .......... *F16D 65/28* (2013.01); *F15B 15/1452* (2013.01); *F15B 15/28* (2013.01); *F16D 66/00* (2013.01); *F16D 55/02* (2013.01); *F16D 2066/005* (2013.01)

(58) Field of Classification Search
CPC ........... F15B 7/08; F15B 2015/14; F09B 9/14
USPC .............................. 188/352, 382; 303/48, 49
See application file for complete search history.

(56) References Cited

U.S. PATENT DOCUMENTS

| | | | | | |
|---|---|---|---|---|---|
| 1,610,174 | A | * | 12/1926 | Smith | F16N 13/08 417/63 |
| 1,611,434 | A | * | 12/1926 | Graham | B60T 17/222 60/584 |
| 1,699,293 | A | * | 1/1929 | Holtson | F16N 3/12 222/326 |
| 2,217,827 | A | * | 10/1940 | Wilkerson | B60T 17/222 188/352 |
| 2,970,442 | A | * | 2/1961 | Blackwell | F02D 25/02 416/157 R |
| 3,026,850 | A | * | 3/1962 | Clifton | B30B 15/28 91/61 |
| 3,651,996 | A | * | 3/1972 | McFarland | F04B 9/14 417/437 |
| 3,884,040 | A | * | 5/1975 | Green | F15B 7/08 74/89.14 |
| 5,009,294 | A | * | 4/1991 | Ghoneim | B60T 8/175 701/87 |

(Continued)

FOREIGN PATENT DOCUMENTS

| | | | | |
|---|---|---|---|---|
| CN | 2041738 | U | * | 7/1989 |
| WO | WO-2016155722 | A1 | * 10/2016 | F16H 57/0497 |

*Primary Examiner* — Robert A. Siconolfi

(74) *Attorney, Agent, or Firm* — Hall Estill Law Firm

(57) ABSTRACT

A pressure generation system that includes a pressure driving device, a sleeve and a piston sealingly and slidably disposed in the sleeve. The pressure generation system also includes a threaded shaft secured to the pressure driving device, the threaded shaft engages the piston to move the piston within the sleeve to compress fluid disposed in the sleeve to provide a pressurized fluid to a braking system via a pressure line. A method of applying constant pressure to a bullwheel tensioner. The method includes increasing the pressure of fluid of a braking system via the pressure generation system.

20 Claims, 7 Drawing Sheets

(56)        References Cited

U.S. PATENT DOCUMENTS

| | | | | |
|---|---|---|---|---|
| 5,655,371 | A * | 8/1997 | Chuang | F15B 7/005 |
| | | | | 60/545 |
| 5,713,723 | A * | 2/1998 | Hathaway | F04B 9/14 |
| | | | | 417/570 |
| 8,834,158 | B2 * | 9/2014 | Leiner | A61C 5/62 |
| | | | | 433/90 |
| 2008/0257669 | A1 * | 10/2008 | Reuter | B60K 6/485 |
| | | | | 188/352 |
| 2020/0172074 | A1 * | 6/2020 | Krautter | B60T 13/66 |
| 2021/0246918 | A1 * | 8/2021 | Johst | B23P 19/067 |
| 2022/0355774 | A1 * | 11/2022 | Bruex | B60T 8/94 |

* cited by examiner

CONSTANT PRESSURE GENERATING SYSTEM

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to a pressure generation system that provides constant pressure to a braking system for various applications, such as a bullwheel tensioner.

2. Description of the Related Art

There are numerous ways to generate pressure for braking systems. A lot of the ways pressure for braking systems is generated fluctuates and cannot be made constant.

Accordingly, there is a need for a device that can generate a constant pressure for a braking system.

SUMMARY OF THE DISCLOSURE

The present disclosure is directed to a pressure generation system that includes a pressure driving device, a sleeve and a piston sealingly and slidably disposed in the sleeve. The pressure generation system also includes a threaded shaft secured to the pressure driving device, the threaded shaft engages the piston to move the piston within the sleeve to compress fluid disposed in the sleeve to provide a pressurized fluid to a braking system via a pressure line.

The present disclosure is also directed to a method of applying constant pressure to a bullwheel tensioner. The method includes increasing the pressure of fluid of a braking system via the pressure generation system.

DETAILED DESCRIPTION OF THE DISCLOSURE

Figure 1:
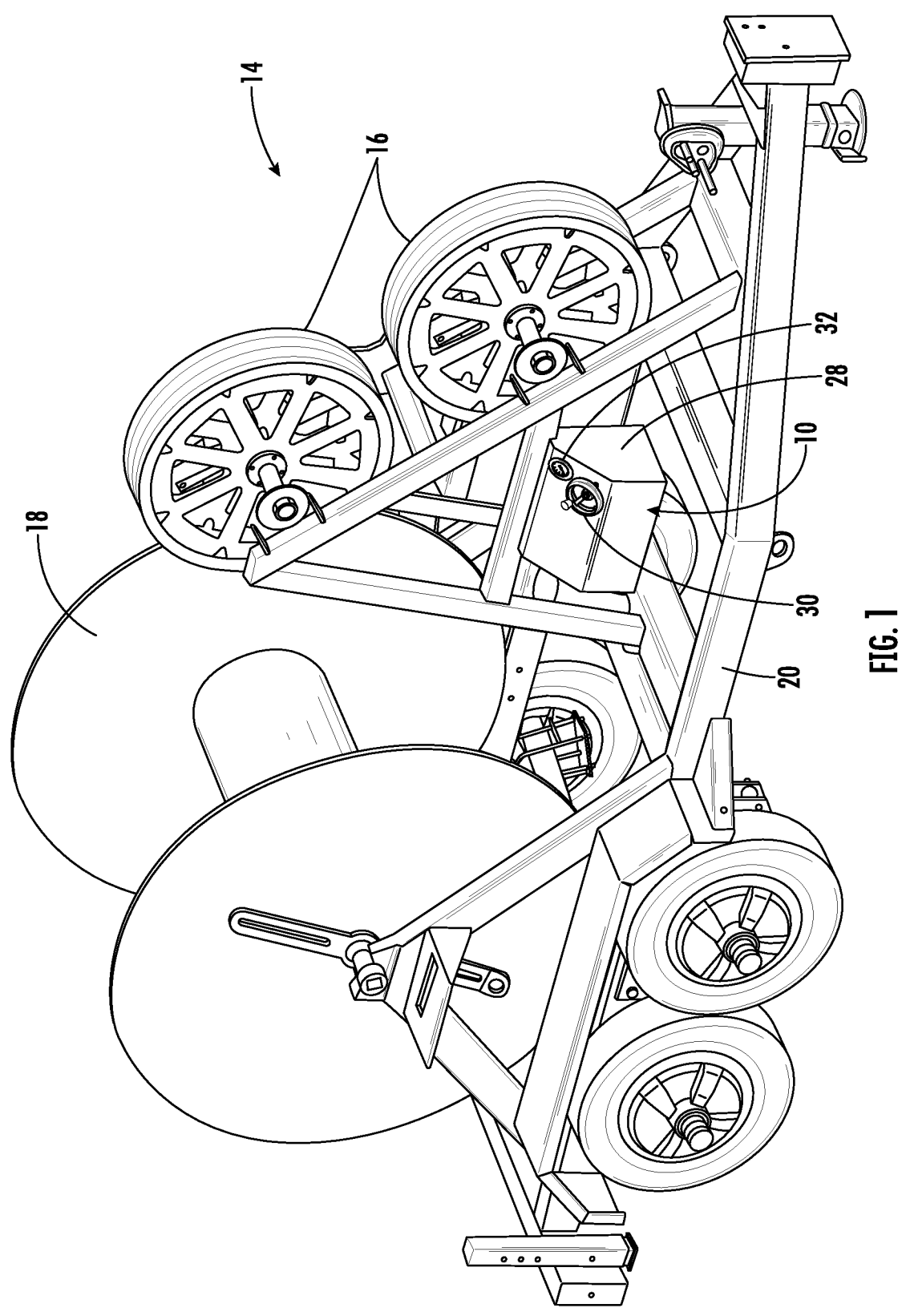
FIG. 1 is a perspective view of a bullwheel tensioner incorporating a pressure generating system constructed in accordance with the present disclosure.
Figure 2:
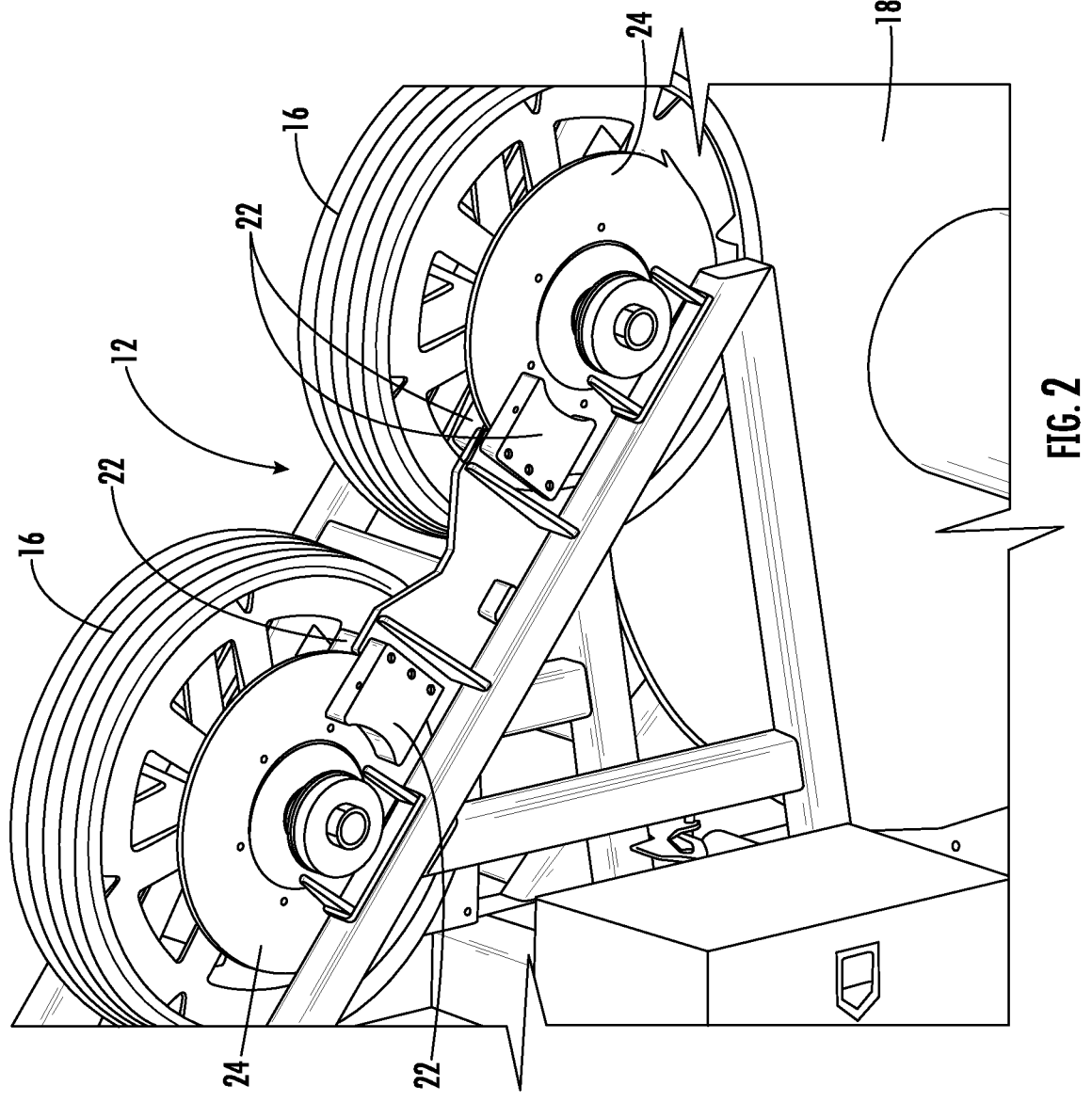
FIG. 2 is a perspective view of a braking system constructed in accordance with the present disclosure.
Figure 3:
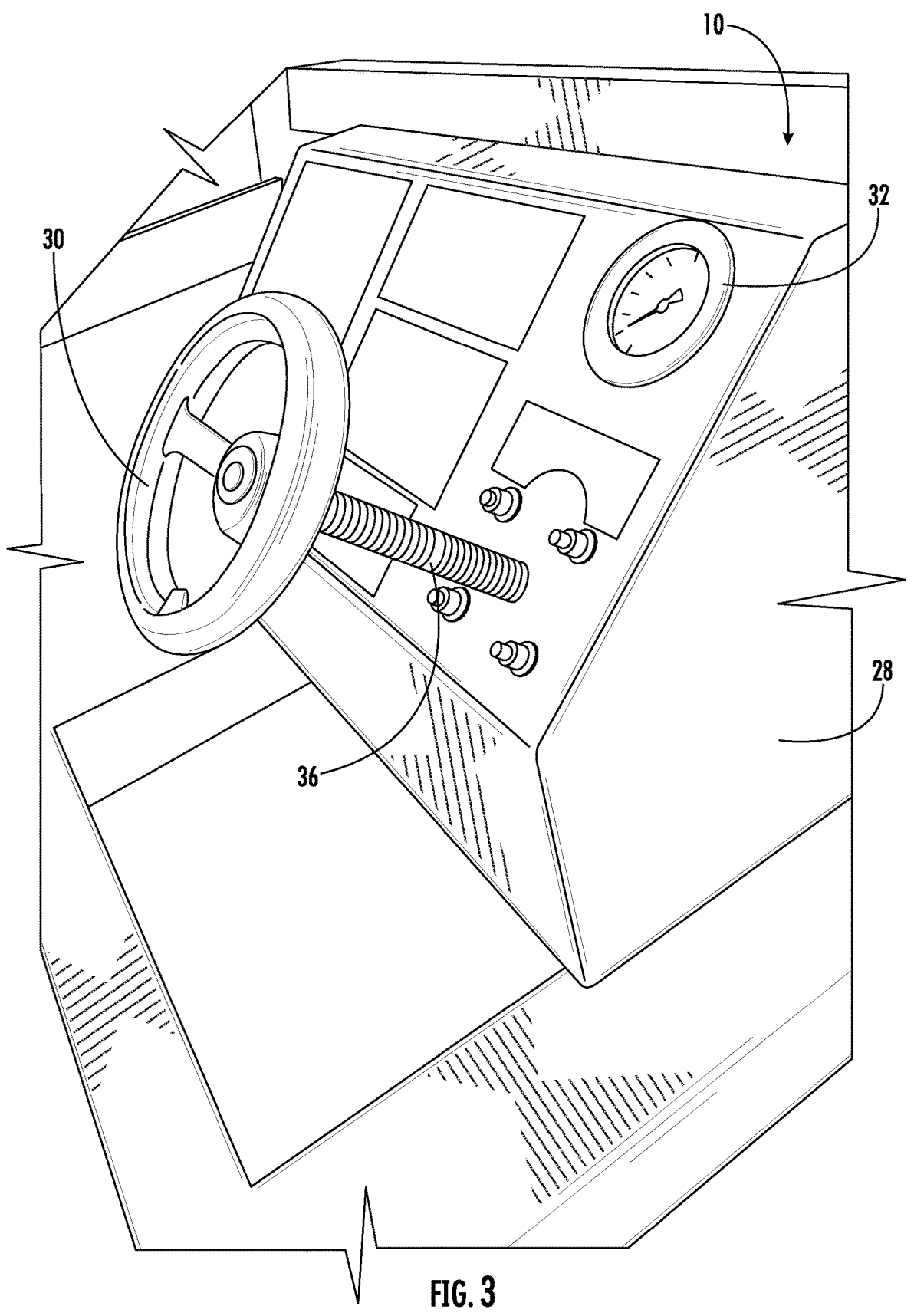
FIG. 3 is a perspective view of a part of the pressure generating system constructed in accordance with the present disclosure.
Figure 4:
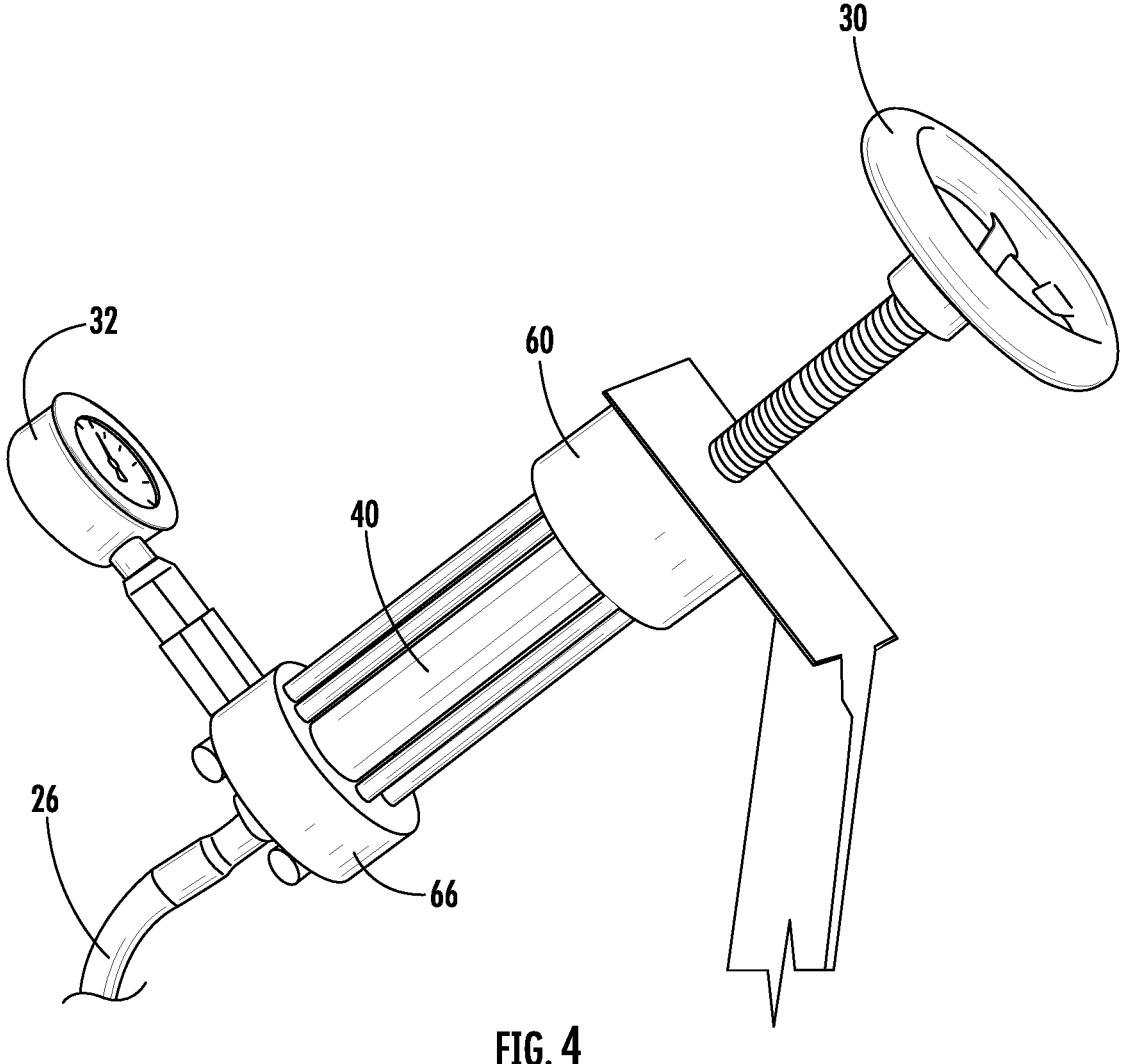
FIG. 4 is a perspective view of a part of the pressure generating system constructed in accordance with the present disclosure.

Referring now to FIGS. 1A-1C, shown therein is pressure generation system 10 for use with a braking system 12 for a particular application, such as in conjunction with a bullwheel tensioner 14 shown in FIGS. 1-7. In this exemplary embodiment, the bullwheel tensioner 14 includes a wheels 16 and a drum 18 for managing the wire tension is being applied to. The wheels 16 and drum 18 can be mounted to a trailer 20. The braking system 12 for the bullwheel tensioner 14 includes brake calipers 22 and a rotor 24 that is rotationally linked to the wheels 16. The brake calipers 22 have brake pads (not shown) disposed therein that engage the rotors 24 to slow the desired wheel 16 of the bullwheel tensioner 14. Brake fluid can be supplied to the braking system 12 from the pressure generation system 10 via a pressure line 26. The pressure line 26 can deliver pressurized brake fluid from the pressure generation system 10 to the calipers 22. The braking system 12 can include any number of parts needed to transfer the pressure from the brake fluid to the brake pads, such as brake pistons (not shown) to force the brake pads against the rotors 24 with an even distribution.

Figure 5:
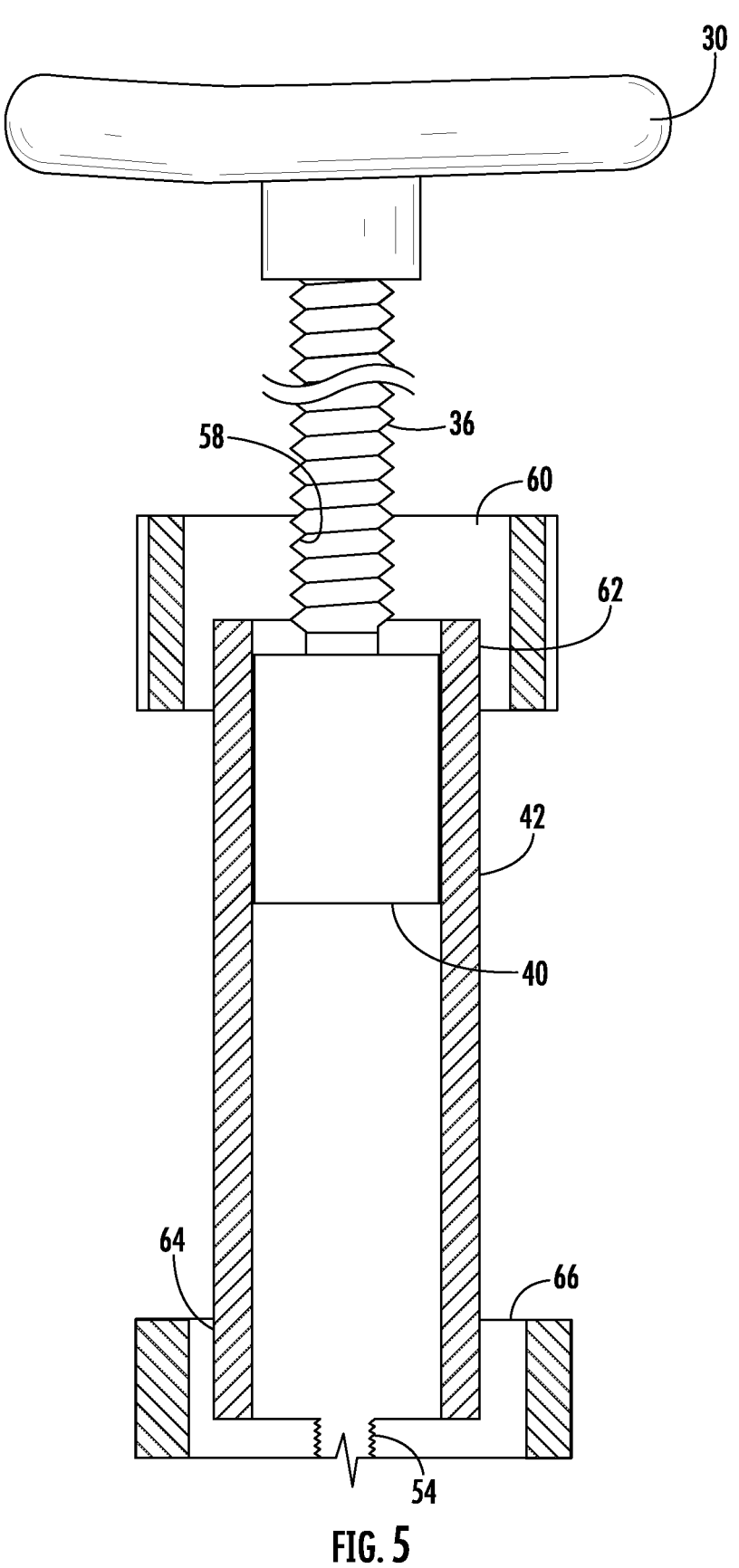
FIG. 5 is cross-sectional view of a part of the pressure generating system constructed in accordance with the present disclosure.
Figures 6A, 6B:
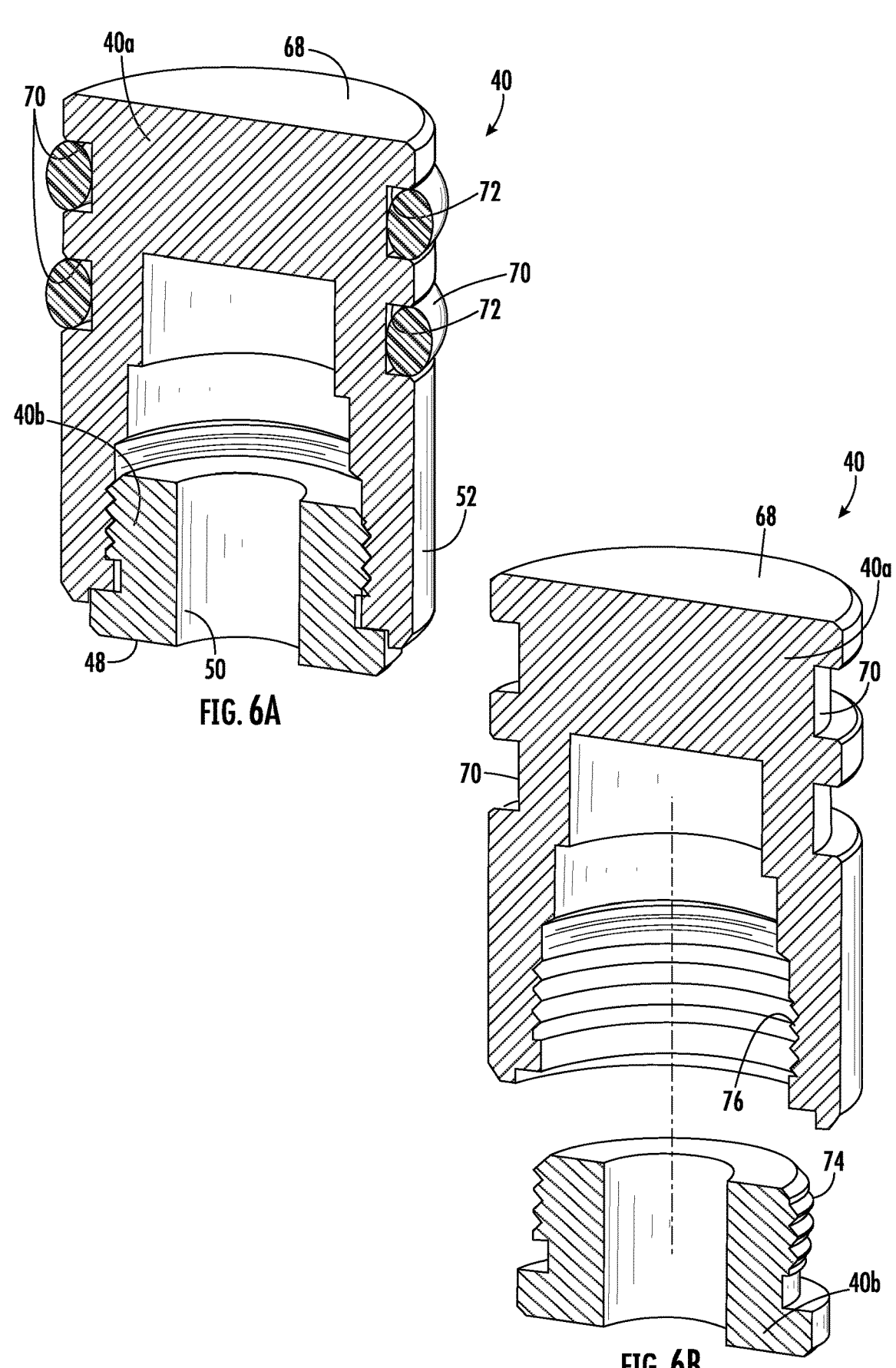
FIGS. 6A and 6B are cross-sectional views of a portion of the pressure generating system constructed in accordance with the present disclosure.
Figure 7:
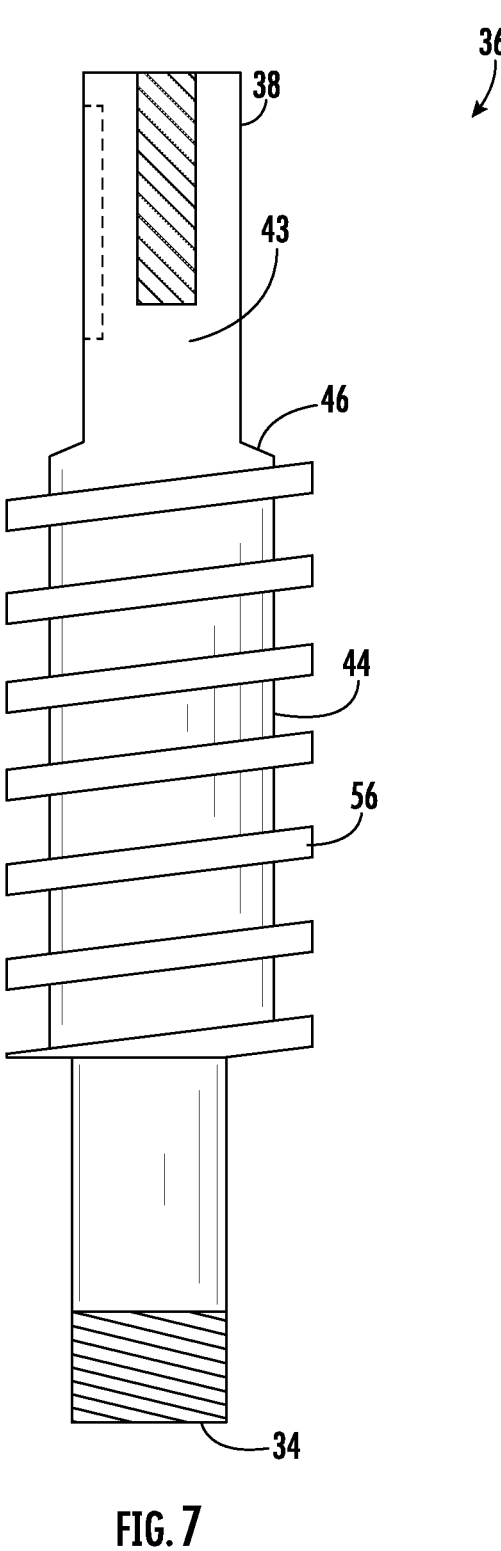
FIG. 7 is a cross-sectional view of another portion of the pressure generating system constructed in accordance with the present disclosure.

As shown in FIGS. 5-7, the pressure generation system 10 can include a housing 28 for encapsulating a majority of the components of the pressure generation system 10, a pressure driving device 30 for providing a user with a mechanical means for manipulating the pressure generated by the pressure generation system 10, and a pressure gauge 32 for providing a pressure readout of the pressure of the pressure generation system 10. The pressure gauge 32 can be any type of pressure gauge known in the art, such as digital or analog. The pressure driving device 30 can be a dial, wheel, etc that can be turned so as to increase or decrease the pressure of the fluid by the pressure generation system 10 responsive to the direction the pressure driving device 30 is turned. The pressure driving device 30 is attached to a first end 34 of a threaded shaft 36. The threaded shaft 36 extends into the housing 28 where a second end 38 of the threaded shaft 36 engages with a piston 40 slidably disposed within a sleeve 42.

The second end 38 of the threaded shaft 36 can have a pin portion 43 that has a smaller diameter than a main body 44 of the threaded shaft 36 and be insertable into the piston 40. The threaded shaft 36 can have a shoulder portion 46 where the main body 44 transitions to the pin portion 43 of the threaded shaft 36. The shoulder portion 46 can abut an outer first end 48 of the piston 40 and the pin portion 43 can extend into an opening 50 in a first end 52 of the piston 40. The opening 50 can include a thrust bearing (not shown) to permit the pin portion 43, and thus the threaded shaft 36, to rotate without rotating the piston 40 as the threaded shaft moves the piston 40 within the sleeve 42. There is fluid disposed in the sleeve 42 between the piston 40 and a fluid opening 54 that fluidically communicates with the pressure line 26.

The threaded portion 56 of the threaded shaft 36 engages a threaded opening 58 of a first end cap 60 that is secured to a first end 62 of the sleeve 42. A second end cap 66 can be disposed on a second end 64 of the sleeve 42 wherein the fluid opening 54 is disposed in the second end cap 66. As the threaded shaft 36 is turned in the threaded opening 58, the shoulder portion 46 is forced up against the outer first end 48 of the piston 40 to force the piston 40 toward the second end 64 of the sleeve 42. This compresses the fluid in the sleeve 42 and the pressure line 26 and increases the pressure of the fluid in the braking system 12.

The piston 40 includes a piston head 68 for engaging the fluid in the sleeve 42 and forcing the fluid toward the fluid opening 54. The piston 40 can also include seal grooves 70 disposed circumferentially around the piston head 68 for seal members 72 to prevent the fluid from moving to the first end 52 of the piston 40. In one embodiment, the piston 40 can be comprised of a first piston portion 40a and a second piston portion 40b. The second piston portion 40b can include threads 74 that engage with threads 76 of the first piston portion 40a to create the piston 40. The first piston portion 40a would include the piston head 68 and the seal grooves 70. The second piston portion 40b would include the opening 50 in the piston 40 that engages with the threaded shaft 36.

The application is also directed toward a method of increasing pressure of fluid used in the braking system 12 via the pressure generation system 10. The method includes the step of turning the threaded shaft 36 to move the piston 40 in the sleeve 42. The method can also include the step of decreasing the pressure of the fluid used in the braking system 12 via the pressure generation system 10. The pressure of the braking system 12 and the pressure generation system 10 can also be monitored.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A pressure generation system, the pressure generation system comprising:
   a pressure driving device;
   a sleeve;
   a piston sealingly and slidably disposed in the sleeve; and
   a threaded shaft secured to the pressure driving device, the threaded shaft engages the piston to move the piston within the sleeve to compress fluid disposed in the sleeve to provide a pressurized fluid to a braking system via a pressure line; and
   a threadless pin portion disposed on the threaded shaft that engages an threadless opening dispose in the piston.

2. The pressure generation system of claim 1 further comprising a first endcap securably disposed on a first end of the sleeve.

3. The pressure generation system of claim 2 further comprising a second endcap disposed on a second end of the sleeve, the second endcap having a fluid opening therein to fluidically connect fluid in the sleeve with the pressure line.

4. The pressure generation system of claim 2 wherein the piston includes a first end that is a piston head to engage the fluid in the sleeve.

5. The pressure generation system of claim 4 wherein the threaded portion of the threaded shaft is wider than the pin portion of the threaded shaft.

6. The pressure generation system of claim 5 wherein a shoulder is created where the threaded shaft transitions from the threaded shaft to the pin portion, the pin portion of the threaded shaft extends into the opening the second end of the piston and the shoulder engages an outer part of the second end of the piston.

7. The pressure generation system of claim 6 wherein the piston is slidably forced toward the second endcap as the threaded shaft is rotated independently of the piston.

8. The pressure generation system of claim 1 further comprising a pressure gauge for providing the pressure of the fluid in the braking system.

9. The pressure generation system of claim 1 further comprising a housing to encapsulate portions of the pressure generation system.

10. A method, the method comprising:
    increasing the pressure of fluid of a braking system via a pressure generation system, the pressure generation system comprising:
    a pressure driving device;
    a sleeve;
    a piston sealingly and slidably disposed in the sleeve; and
    a threaded shaft secured to the pressure driving device, the threaded shaft engages the piston to move the piston within the sleeve to compress fluid disposed in the sleeve to provide a pressurized fluid to a braking system via a pressure line; and
    a threadless pin portion disposed on the threaded shaft that engages an threadless opening dispose in the piston.

11. The method of claim 10 further comprising the step of decreasing the pressure of the pressurized fluid.

12. The method of claim 11 further comprising the step of monitoring the pressure of the pressurized fluid in the pressure generation system.

13. The method of claim 10 further comprising a first endcap securably disposed on a first end of the sleeve.

14. The method of claim 13 further comprising a second endcap disposed on a second end of the sleeve, the second endcap having a fluid opening therein to fluidically connect fluid in the sleeve with the pressure line.

15. The method of claim 13 wherein the piston includes a first end that is a piston head to engage the fluid in the sleeve.

16. The method of claim 15 wherein the threaded portion of the threaded shaft is wider than the pin portion of the threaded shaft.

17. The method of claim 16 wherein a shoulder is created where the threaded shaft transitions from the threaded shaft to the pin portion, the pin portion of the threaded shaft extends into the opening the second end of the piston and the shoulder engages an outer part of the second end of the piston.

18. The method of claim 17 wherein the piston is slidably forced toward the second endcap as the threaded shaft is rotated independently of the piston.

19. The method of claim 10 further comprising a pressure gauge for providing the pressure of the fluid in the braking system.

20. The method of claim 10 further comprising a housing to encapsulate portions of the pressure generation system.

* * * * *